United States Patent [19]

Imai et al.

[11] 3,719,660
[45] March 6, 1973

[54] 2-FURFURYLTHIOINOSINE-5'-PHOSPHATE COMPOUNDS

[75] Inventors: Kin-ichi Imai, Yoshio Yoshioka, Jun Toda, Hisashi Aoko, all of Osaka, Japan

[73] Assignee: Takeda Chemical Industries, Ltd., Osaka, Japan

[22] Filed: June 10, 1970

[21] Appl. No.: 45,222

[30] Foreign Application Priority Data

June 13, 1969 Japan ..................................44/47113
June 21, 1969 Japan ..................................44/49180

[52] U.S. Cl. ..........................260/211.5 R, 99/140 N
[51] Int. Cl. ..............................................C07d 51/54
[58] Field of Search ...............................260/211.5 R

[56] References Cited

UNITED STATES PATENTS 3,408,206   10/1968   Yamazaki et al. ..............260/211.5 R

*Primary Examiner*—Elbert L. Roberts
*Assistant Examiner*—Johnnie R. Brown
*Attorney*—Wenderoth, Lind & Ponack

[57] ABSTRACT

2-Furfurylthioinosine-5'-phosphate and a physiologically acceptable salt thereof have excellent ability for improving and/or enhancing the favor of foods and beverages. Moreover, there is a significant synergistic action between these compounds and monosodium glutamate. Also provided are novel starting materials for preparing these compounds.

5 Claims, No Drawings

2-FURFURYLTHIOINOSINE-5'-PHOSPHATE COMPOUNDS

This invention relates to a novel seasoning compound and compositions, a method for preparing such compound and compositions and a method for improving or enhancing the flavor of foods and beverages. This invention also concerns the novel compound to be utilized in preparing the seasoning compounds.

5'-Purinenucleotides such as 5'-inosinic acid and 5'-guanylic acid, usually as the disodium salts, have been employed in practice as chemical condiments because of their strong flavor-enhancing effect (see French Pat. Nos. 1,219,220 and 1,255,334).

It has been found that 2-furfurylthioinosine-5'-phosphate and a physiologically acceptable salt thereof, which are novel compounds, have a much higher ability to improve or to enhance the flavor of foods or beverages than 5'-inosinic acid and 5'-guanylic acid. 2-Furfuryl-thioinosine-5'-phosphate described hereinafter includes a physiologically acceptable salt thereof, unless otherwise noted.

It has further been found that there is a significant synergistic action between 2-furfurylthioinosine-5'-phosphate and monosodium glutamate.

It is an object of the present invention to provide a novel compound and novel seasoning compositions prepared therefrom. Another object of the present invention is to provide a method for producing the compound and a method for preparing the seasoning compositions. A further object of the present invention is to provide a method for improving or enhancing the flavor of foods and beverages.

2-Furfurylthioinosine-5'-phosphate is prepared by for example, reacting 2-furfurylthioinosine whose both 2'-and 3'-hydroxyl groups may be protected by, for example, isopropylidene group, borate complex, with a phosphorylating agent, and subjecting the resultant product to hydrolysis. The phosphorylation and the subsequent hydrolysis may be effected, for example, by either of the following methods:

A. 2-Furfurylthio-2', 3'-isopropylideneinosine is reacted with a phosphorylating agent. As the phosphorylating agent, there may be employed for example a phosphoric acid halide such as pyrophosphoryl tetrachloride, phosphoryl chloride or partially hydrolyzed phosphoryl chloride. The phosphorylation reaction proceeds smoothly at a temperature of from about -25° to about 30° C, especially from about 0° to about 10° C. When a reaction solvent is required, a conventional organic solvent such as dioxane or pyridine is employed. The hydrolysis of the resultant product is carried out by per se known procedure, for example, by weakening the acidity of the reaction mixture, preferably to about pH 1.5 to 3.0 with the addition of an alkaline material such as sodium hydroxide or sodium carbonate, and heating the mixture at a temperature of from about 60° C to about 80° C for 15 to 60 minutes to give 2-furfuryl-thioinosine-5'-phosphate.

B. 2-Furfurylthioinosine is reacted directly with a phosphorylating agent. In this case, employment of phenols, e.g., phenol, cresol and xylenol, or carbonitriles, e.g., acetonitrile and benzonitrile as the reaction solvent, and pyrophosphoryl tetrachloride as the phosphorylating agent, gives optimum results. The reaction proceeds smoothly at a temperature of from about -25° to about 30° C, especially from about 0° to about 10° C. The resultant product is hydrolyzed in a simple conventional manner, for example, by pouring the reaction mixture into water, preferably cool water to give 2-furfurylthioinosine-5'-phosphate.

2-Furfurylthioinosine and 2-furfurylthio-2',3'-isopropylideneinosine to be employed as the starting materials are novel compounds. They may be prepared, for example, by reacting an alkali metal salt (e.g., sodium salt, potassium salt) or ammonium salt of 2-mercaptoinosine or 2-mercapto-2',3'-isopropylideneinosine with 2-furfurylhalide such as furfuryl chloride and furfuryl bromide. The reaction proceeds smoothly at a room temperature (15° to 30° C) in a solvent. As the solvent, there may preferably be employed pyridine, methyl alcohol, mixture of methyl alcohol and water, and the like.

For the purpose of this invention, 2-furfurylthioinosine-5'-phosphate thus obtained may be employed in the free form or as a physiologically acceptable salt, such as an alkali metal salt (e.g. sodium salt or potassium salt), an alkaline earth metal salt (e.g. calcium salt or magnesium salt), an ammonium salt, or a non-toxic amine salt such as cyclohexylamine salt.

The threshold value in water of disodium 2-furfurylthioinosin-5'-phosphate of the present invention, determined by "The Forced Choice Method of Limits" described in American Journal of Psychology, Vol.69, pp. 672–673 is 0.0007 percent.

The threshold value of 2-furfurylthioinosine-5'-phosphate is far lower than that (0.02 percent) of disodium 5'-inosinate, which illustrates that this compound can be detected at a lower concentration that 5'-inosinic acid. Further, as mentioned hereinbefore, when 2-furfurylthioinosine-5'-phosphate is employed in combination with monosodium glutamate, a remarkable synergistic action is exhibited. As clearly shown in tests described hereinafter, in the co-presence of monosodium glutamate, for example, the flavor-enhancing effect of disodium 2-furfurylthioinsine-5'-phosphate is about 17 times as strong as that of disodium 5'-inosinate.

It is also known that 2-methylthioinosine-5'-phosphate and 2-ethylthioinosine-5'-phosphate show, in the co-presence of monosodium glutamate, a flavor-enhancing effect of 8.0 and 7.5 times as strong as that of 5'-inosinic acid, respectively (Agricultural and Biological Chemistry, Vol. 32, pp. 797–802(1968)). 2-Furfurylthioinosine -5'-phosphate of the present invention exhibits a greater strong flavor-enhancing effect than the known 5'-inosinic acid derivatives.

Furthermore, 2-furfurylthioinosine-5'-phosphate is characterized by the following excellent properties:

1. Not only is this chemically stable but this is relatively stable against phosphatases.
2. This is non-toxic to mammals.
3. This can be dissolved in various kinds of edible organic solvents or edible oils and fats.
4. This can be employed as one of the various kinds of physiologically acceptable salts.

2-Furfurylthioinosine-5'-phosphate may be added to foods or beverages in a solid state or in a liquid state, i.e., dissolved in water or a palatable and edible organic solvent, e.g. alcohol. In improving or enhancing the flavor of foods or beverages, the foods or beverages are mixed with 2-furfurylthioinosine-5'-phosphate, or are impregnated with a solution of 2-furfurylthioinosine-5'-phosphate, or the solution is sprinkled over the food. The addition of 2-furfurylthioinosine-5'-phosphates is carried out during or after the preparation of the foods or beverages.

Foods or beverages to be seasoned include, for example, fermented foods such as bean paste (Miso), soy sauce, vinegar or sake, paste such as ham, sausage, steamed fish paste (Kamaboko or Chikuwa), meats such as whale meat, poultry meat, pork or beef, noodles such as macaroni milk and its processed products such as cow milk, condensed milk or cheese, processed vegetables such as tomato juice or canned spinach, and cooked foods such as soups or stews.

In most cases, it is preferable to employ 2-furfurylthioinosine-5'-phosphate together with monosodium glutamate and if desired, other chemical condiments such as disodium 5'-inosinate, disodium 5'-guanylate, sodium aspartate or sodium succinate. The ratio of 2-furfurylthioinosine-5'-phosphates to the monosodium glutamate is advantageously from about 1/5000 to about 1/10 by weight.

The preparation of the seasoning composition comprising 2-furfurylthioinosine-5'-phosphate and monosodium glutamate may be carried out by simple mixing, or by preparing a base material of either 2-furfurylthioinosine-5'-phosphate or monosodium glutamate and successively adhering the other component to the base material. If desired, a composition of 2-furfurylthioinosine-5'-phosphate and monosodium glutamate, irrespective of whether it is powdery of granular, may be coated with a known coating agent. Aliphatic acid esters of sugars, e.g. sucrose fatty acid ester, gelatin, casein, edible waxes, stearic acid, vegetable proteins, monoglycerides and the like may be used as the coating agent.

The most effective amount of 2-furfurylthioinosine-5'-phosphate to be employed varies with the kinds of foods or beverages, but generally from about 0.00005 to 0.01 percent relative to the weight of the foods or beverages as served is preferable.

In the instant specification and claims, percentages are by weight except in the case where the meaning is clearly otherwise from the context. Parts by volume bear the same relationship to parts by weight as do milliliters to grams. The "probit analysis" employed in the following Test is described in Probit Analysis, A Statistical Treatment of the Sigmoid Response Curve published by Cambridge Univ. Press in 1952.

To compare quantitatively the flavor-enhancing effect of 2-furfurylthioinosine-5'-phosphate with that of disodium 5'-inosinate, a test shown in Test 1 was carried out in accordance with the "constant methods" (panel: 25 persons) in which Sample S is a standard sample and the Samples 1 to 5 are variable ones. The concentration of disodium 5'-inosinate equivalent to Sample S in flavor-enhancing effect was determined by the application of the probit analysis to the resulting data.

Test 1

Samples and results

| | Sodium chloride (%) | Monosodium glutamate (%) | Disodium 2-furfurylthioinosine-5'-phosphate (%) | |
|---|---|---|---|---|
| Sample S | 1.0 | 0.05 | 0.00026 | |
| | Sodium Chloride (%) | Monosodium glutamate (%) | Disodium -5'-inosinate (%) | No. of persons who judged the flavor of Sample S to be stronger in comparison with Samples 1 to 5 |
| Sample 1 | 1.0 | 0.05 | 0.00219 | 20 (80%) |
| Sample 2 | 1.0 | 0.05 | 0.00296 | 19 (76%) |
| Sample 3 | 1.0 | 0.05 | 0.00400 | 16 (64%) |
| Sample 4 | 1.0 | 0.05 | 0.00540 | 9 (36%) |
| Sample 5 | 1.0 | 0.05 | 0.00729 | 5 (20%) |

The probit analysis, when applied to the above-mentioned results, revealed that 0.00026 percent of disodium 2-furfurylthioinosine-5'-phosphate is equivalent to 0.0045 percent of disodium 5'-inosinate in its flavor-enhancing effect, and therefore that the flavor-enhancing effect of disodium 2-furfurylthioinosine-5'-phosphate is about 17.0 times as strong as that of disodium 5'-inosinate.

EXAMPLE 1

To a suspension of 13.6 parts by weight of potassium 2-mercaptoinosine in 200 parts by volume of pyridine, is added under ice-cooling a solution of 7.5 parts by weight of furfuryl chloride in 40 parts by volume of ether and the mixture is reacted at a room temperature for 1.5 hour. After concentrating the reaction mixture, the residue is added to 100 parts by volume of water to give crystals. The crystals are collected by filtration and the filtrate is recrystallized from water to give colorless needles of 2-furfurylthioinosine melting at 212–213° C. The yield is 12.5 parts by weight (81.5 percent).

$[\alpha]D^{22} = +12.0° (c=1.0, \text{in methanol})$

Elementary analysis

Calculated for $C_{15}H_{16}N_4O_6S$
C 47.36%, H 4.24%, N 14.73%, S 8.43%
Found C 47.21%, H 4.09%, N 14.56%, S 8.33%

Ultraviolet absorption spectra $\lambda^{0.1N\,HCl}_{max}$ 267 $\mu$ ($\epsilon$ 14,600)
$\lambda^{0.1N\,HCl}_{min}$ 241 $\mu$
$\lambda^{H_2O}_{max}$ 261 $\mu$ ($\epsilon$ 13,500), 280 $\mu$ (shoulder)
$\lambda^{H_2O}_{min}$ 239 $\mu$
$\lambda^{0.1N\,NaOH}_{max}$ 271 $\mu$ ($\epsilon$ 14,300), 225 $\mu$ ($\epsilon$ 25,300)
$\lambda^{0.1N\,NaOH}_{min}$ 248 $\mu$ This product gives a single ultraviolet absorption spot at RF 0.73 in paper chromatography (developer: a mixture of isopropanol, 28 percent aqueous ammonia and water (7:1:2), descending method). To a suspension of 0.6 part by weight of the 2-furfurylthioinosine in 70 parts by volume of acetonitrile, is added 1.1 parts by volume of pyrophosphoryl chloride at a temperature of 0°–10 C, and the mixture is reacted at the same temperature for 2 hours. The reaction solution is poured into 500 parts by volume of ice water and the aqueous solution is adjusted to pH 2 with 4N-sodium hydroxide. The solution is subjected to desalting with 9 parts by weight of active carbon. Thus-desalted solution is concentrated and the concentrate is applied to a 4 × 12cm column of diethylaminoethyl cellulose exchanger (chloride-form). After washing with water the column is eluted with 1,730 parts by volume of 0.003N- hydrochloride solution including 0.01 mol of sodium chloride, and the resulting eluate is desalted with 3 parts by weight of active carbon. It is then treated with 2.2 parts by volume of 1N-sodium hydroxide, followed by concentration.

Finally, ethanol is added to the concentrate, whereupon 0.603 part by weight of colorless powder of disodium 2-furfurylthioinosine-5'-phosphate is obtained.

Elementary analysis

Calculated for $C_{15}H_{15}N_4O_9PSNa_2 \cdot H_2O$
C 34.48% H 3.28% N 10.73%
P 5.94% S 6.14%
Found C 34.65% H 3.55% N 10.76%
P 5.73% S 6.49%

$[\alpha]_D^{23} = -6.1° (c=0.43, \text{in water})$ $\lambda_{max}^{0.1NHCl}$ 269 $\mu$ ($\epsilon$ 15,100)
$\lambda_{min}^{0.1NHCl}$ 241 $\mu$
$\lambda_{max}^{H_2O}$ 262 $\mu$ ($\epsilon$ 13,900), 282 $\mu$ (Shoulder)
$\lambda_{min}^{H_2O}$ 240 $\mu$
$\lambda^{0.1NNaOH}$ 224.5 $\mu$ ($\epsilon$ 25,400), 270 $\mu$ ($\epsilon$ 14,600)
$\lambda_{min}^{0.1NNaOH}$ 248 $\mu$ The paper-electrophorogram of this product (0.05 M Phosphate buffer solution, pH 7.5) shows a single ultraviolet absorption spot at the distance corresponding to 5 times the mobility of the starting material 2-furfurylthioinosine.

EXAMPLE 2

0.3 Part by weight of disodium 2-furfurylthioinosine-5'-phosphate, 1,000 parts by weight of table salt, 600 parts by weight of sugar, 30 parts by weight of citric acid, 200 parts by weight of hydrolyzed vegetable protein, 300 parts by weight of monosodium glutamate, 2 parts by weight of onion powder, 2 parts by weight of white pepper and 100 parts by weight of vegetable shortening are homogeneously mixed to give about 2,000 parts by weight of powdery soup composition.

1 Part by weight of this composition is dissolved in 50 parts by volume of hot water to give a flavor-enhanced soup.

EXAMPLE 3

To 2,000 parts by weight of powdered monosodium glutamate is gradually added a solution of 20 parts by weight of disodium 2-furfurylthioinosine-5'-phosphate in 150 parts by volume of water. The mixture is kneaded, granulated, dried and sieved to give a granular seasoning composition.

This composition has excellent ability to enhance and improve the flavor of, for example cream soup, when added thereto in the range of from about 0.05 to about 0.2 percent by weight.

EXAMPLE 4

To 8,000 parts by weight of fish paste containing 80 percent of water are added 250 parts by weight of sodium chloride, 30 parts by weight of monosodium glutamate and 0.3 part by weight of disodium 2-furfurylthioinosine-5'-phosphate and the mixture is kneaded. To the mixture there is added 1,000 parts by weight of lard, 350 parts by weight of potato starch and 400 parts by weight of wheat starch and the whole mixture is mingled thoroughly. The resultant paste is packed in a casing. The resultant raw fish sausages are boiled at 85° to 90° C for 1 hour to give flavor-enhanced fish sausages.

EXAMPLE 5

Raw soy sauce prepared by the conventional method is sterilized. To 2,000 parts by volume of thus-treated soy sauce, there is uniformly added 0.06 part by weight of disodium 2-furfurylthioinosine-5'-phosphate to give a flavor-enhanced soy sauce.

EXAMPLE 6

0.3 Part by weight of disodium 2-furfurylthioinosine-5'-phosphate, 1,200 parts by weight of table salt, 250 parts by weight of sugar, 70 parts by weight of citric acid, 200 parts by weight of hydrolyzed vegetable protein, 300 parts by weight of monosodium glutamate, 10 parts by weight of onion powder, 5 parts by weight of garlic powder, 10 parts by weight of powdered carrot, 5 parts by weight of powdered celery and 5 parts by weight of white pepper are homogeneously mixed to give about 2,000 parts by weight of powdery soup composition.

1 Part by weight of this composition is dissolved in 50 parts by volume of hot water to give a flavor-enhanced clear soup.

EXAMPLE 7

0.3 Part by weight of disodium 2-furfurylthioinosine-5'-phosphate, 1,000 parts by weight of table salt, 450 parts by weight of sugar, 200 parts by weight of hydrolyzed vegetable protein, 400 parts by weight of monosodium glutamate. 20 Parts by weight of curry powder, 3,000 parts by weight of skimmed milk powder, 40 parts by weight of powdered butter and 5,000 parts by weight of powdered roux are homogeneously mingled to give powdery soup composition.

1 Part by weight of this composition is dissolved in 10 parts by volume of water, followed by boiling for 5 minutes to give a flavor-enhanced curry cream soup.

EXAMPLE 8

9,000 Parts by weight of table salt is charged into a fluidizing coating apparatus. The temperature of the blowing air is between 120° and 150° C. A solution of 2.5 parts by weight of disodium 2-furfurylthioinosine-5'-phosphate and 997.5 parts by weight of monosodium glutamate in 2,000 parts by volume of water is applied to the fluidizing table salt in a tower by spraying the solution uniformly over the salt. The water is evaporated rapidly with the blowing air to give flavor enhanced table salt.

EXAMPLE 9

Bean paste (Miso) prepared by the conventional method is heated at 85° to 90° C to inactivate phosphatase therein. To 10,000 parts by weight of thus-treated bean paste is uniformly added to a solution of 0.18 part by weight of calcium 2-furfurylthioinosine-5'-phosphate in 100 parts by volume of water to give a flavor-enhanced bean paste.

EXAMPLE 10

To 100,000 parts by volume of Worcestershire sauce prepared by the conventional method is uniformly added 3 parts by weight of disodium 2-furfurylthioinosine-5'-phosphate to give a flavor-enhanced Worcestershire sauce.

EXAMPLE 11

Raw tomato juice is prepared by the conventional method. To 10,000 parts by volume of the tomato juice are added 120 parts by weight of sugar, 50 parts by weight of table salt, 10 parts by weight of monosodium glutamate and 0.005 part by weight of disodium 2-furfurylthioinosine-5'-phosphate and the mixture is sterilized to give a flavor-enhanced tomato juice.

What is claimed is:

1. 2-Furfurylthioinosine-5'-phosphate or a non-toxic physiologically acceptable salt thereof.
2. 2-Furfurylthioinosine-5'-phosphate according to claim 1, wherein the non-toxic physiologically acceptable salt is calcium salt.
3. 2-Furfurylthioinosine-5'-phosphate according to claim 1, wherein the non-toxic physiologically acceptable salt is sodium salt.
4. 2-Furfurylthioinosine.
5. 2-Furfurylthio-2',3'-isopropylideneinosine.

* * * * *